Nov. 10, 1942.　　　L. DE FLOREZ　　　2,301,685

TRAINING APPARATUS

Filed Aug. 13, 1940　　　2 Sheets-Sheet 1

INVENTOR
LUIS DE FLOREZ
BY
ATTORNEY

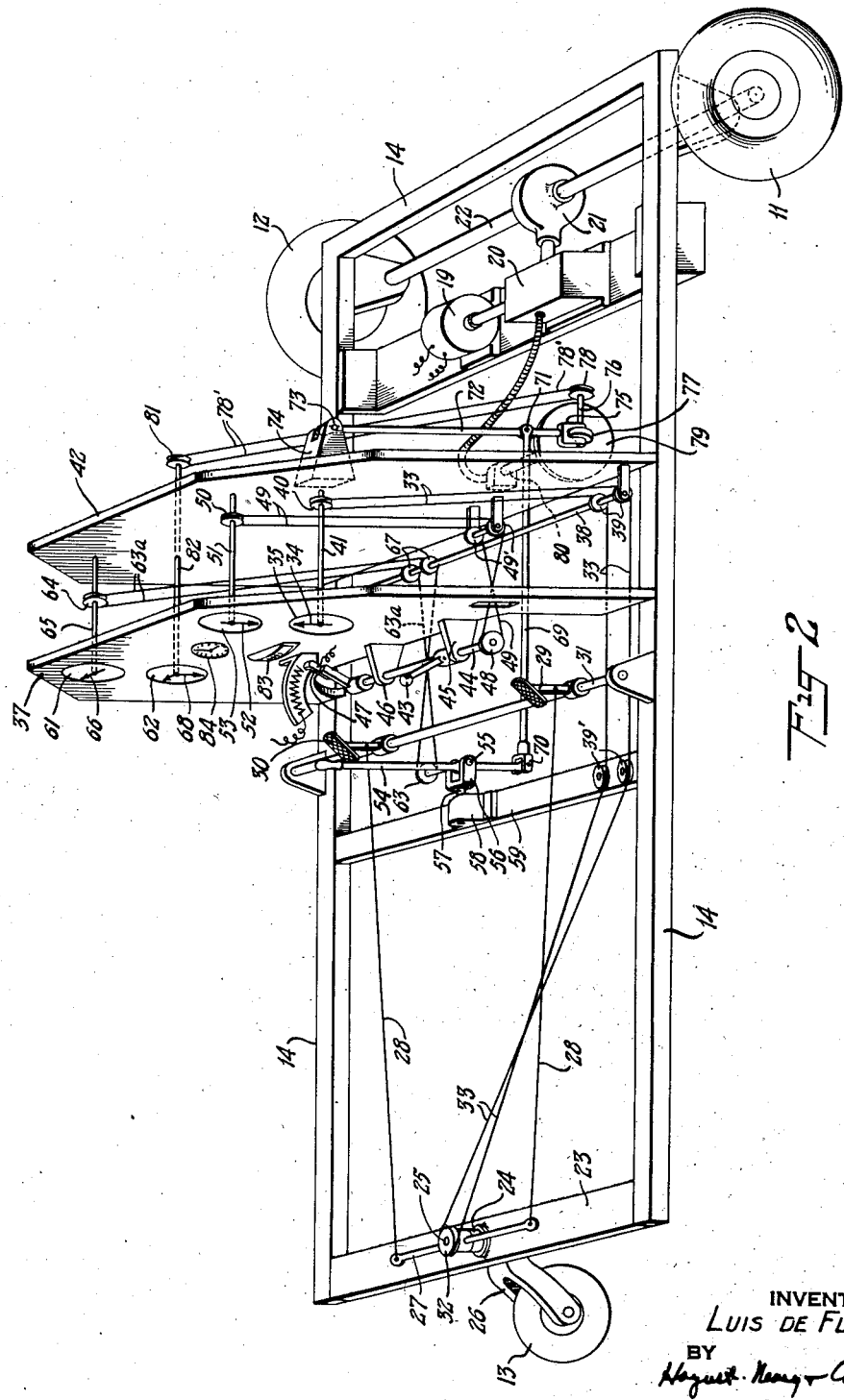

Patented Nov. 10, 1942

2,301,685

UNITED STATES PATENT OFFICE 2,301,685

TRAINING APPARATUS

Luis de Florez, Pomfret, Conn.

Application August 13, 1940, Serial No. 352,358

12 Claims. (Cl. 35—12)

This invention relates to an apparatus for training students in instrument flying, radio navigation, tactics and the like, also in such problems as movement of mechanized troops and surface vessels.

Ground devices now used in training for aeroplane pilots are generally of the fixed base type, the results of the execution of a navigation problem for example being shown either by manual or mechanical marking of a chart following the manipulation of the controls of the trainer. Such trainers require one attendant to a student to produce simulated signals as when flying a beam, or to mark the chart and give instructions. Moreover, in these devices, the radio signals given to the student are manufactured by the instructor depending upon the position in which the instructor believes the student to be and for that reason there is substantial difference in the type of the variations of signals and in the actual sound of the signals over those received from air. Inasmuch as the trainers cannot move from place to place, it is impractical to simulate long range flight problems and long distance bombing or rendezvous. It is also not possible to carry out problems involving a rendezvous of several units at one point.

In accordance with the present invention, a power operated vehicle is provided which may be controlled like an aeroplane by means of control elements similar to or simulating those used in an aeroplane. The vehicle is adapted to move at a low speed, proportional to the air speed of an aeroplane, over an area which may be painted or otherwise marked to simulate a typical terrain or map having military objectives thereon. For example, the vehicle may simulate the speed of an aeroplane flying at the rate of two miles per minute by traveling at the rate of two yards per minute. In this way, a portion of the terrain covering one hundred miles may be simulated by an area one hundred yards long.

The vehicle may be provided with means for varying its speed within a range proportional to the stalling speed of an aeroplane and its top speed and may be steered with the usual pedal or tiller control commonly used in aeroplanes.

The device may also be provided with a stick which is movable through the normal arc of movement of the control stick of an aeroplane. The movements of the stick may control the altimeter and rate of climb indicator on the instrument panel of the device. Inasmuch as the vehicle will travel on a flat surface, the movement of the altimeter and rate of climb indicator will simulate the results obtained by moving the control stick of the aeroplane.

Other instruments such as, for example, a compass, a rate of turn device which is connected to the steering mechanism and an air speed indicator may also be provided so that the vehicle may be controlled similarly to an aeroplane.

In order to teach the student instrument flying and radio navigation, the vehicle may be provided with a telephonic device which simulates radio signals for both beam and code and may be equipped with a hood which conceals from the student the area over which he is navigating the vehicle, so that problems in blind flying and radio navigation can be solved. Inasmuch as the vehicle is movable, a low power radio or audio-frequency transmitter may be used to direct the movements of the vehicle, thus permitting the vehicle to be controlled under conditions substantially identical with the conditions encountered in the radio navigation of aircraft, ships and the maneuvering of mechanized troops.

If desired, the device may be provided with a second compartment for the accommodation of a second student having a compartment with a chart board and radio for long range navigation problems, thus simulating the conditions under which patrol boats operate.

The purpose of the device is to provide equipment that will simulate navigation out of sight of land, navigation above the clouds and to a certain extent navigation flying on instruments. The device does not have the stability difficulties actually found in aerial navigation inasmuch as the vehicle rests upon the ground. However, all such typical problems as point to point navigation, automatic pilot navigation, inspection of moving targets and ships, rendezvous, simulating bombing objectives and the like can be solved with this device. It may also serve to familiarize students with radio and code procedure, loop work and the receipt and execution of orders changed during flight.

For a better understanding of the present invention, reference may be had to the accompanying drawings in which:

Fig. 2 is a perspective view of the chassis of the vehicle disclosing the mechanism connecting the controls of the device and the instruments for indicating the operation of the training device.

Figure 1:
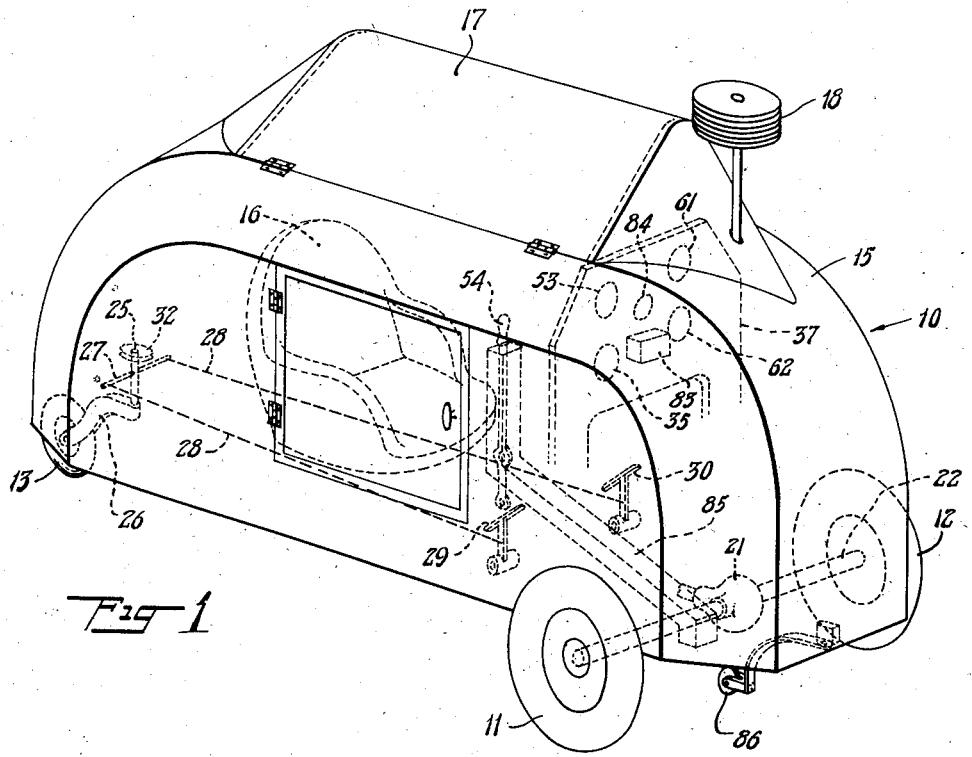
Fig. 1 is a perspective view of a typical form of training vehicle embodying the present invention.
Figure 3:
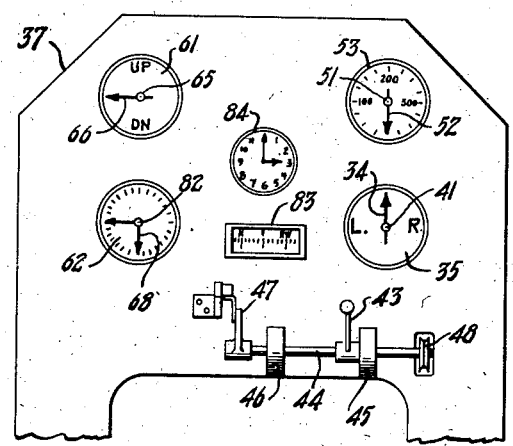
Fig. 3 is a front view of the instrument panel of the device.

As illustrated in Fig. 1, a typical form of the invention may consist of a vehicle 10 provided with a pair of driving wheels 11 and 12 and a rear steering wheel 13 upon which are supported a suitable chassis 14 (Fig. 2) and a body 15.

The body may take any desired shape but preferably is similar in its interior shape to the interior of a cockpit of an aeroplane. A seat 16 is mounted in the interior of the body and a closure or cover 17 is hingedly mounted on the top of the body 15 so that the vision of the student may be cut-off from the exterior in order to simulate blind flying conditions. The closure 17 is formed of frosted or opaque material for the reason mentioned above.

In front of the cockpit of the device is mounted an antenna 18 for a receiver by means of which signals may be transmitted to the student as by means of a low power radio transmitter, or other similar device such as an inductance transmitting station, not shown. It will be understood that the transmitter may be of portable nature and therefore may be moved from place to place in the area over which the vehicle 10 is adapted to travel, so that various problems may be solved in beam flying and radio navigation.

Referring now to Fig. 2 of the drawings, the drive wheels 11 and 12 are actuated by means of an electric motor 19 through a gear reduction box 20 and a differential 21 at a rate of speed proportional to the normal flying speeds of an aeroplane. The differential housing 22 is fixed to the frame 14 upon which the motor 19 and reduction gear box 20 are also supported.

At the rear of the frame 14 is a transverse plate 23 which is provided with a vertically disposed journal 24, receiving a shaft 25 on which the fork 26 mounting the steering wheel 13 is supported. A tiller bar 27 is fixed to the upper end of the shaft 25, the ends of the tiller bar being connected by suitable cables 28 to the steering control pedals 29 and 30 respectively. The pedals are mounted on a shaft 31 extending transversely between the side elements of the frame 14. Movement of the pedals 29 and 30 will turn the steering wheel 13 to cause a change of direction of the vehicle.

In order to indicate this change of direction the shaft 25 is provided with a pulley 32 at its upper end which receives a crossed belt 33 that is connected to a rate of turn pointer 34 associated with a dial 35 on the instrument panel 37.

The instrument panel 37 simulates instrument panel of an aeroplane and is supported on uprights at opposite ends from the side members of the frame 14.

Inasmuch as the belt 33 must make a right angled turn in order to operate the pointer 34, a shaft 38 extending transversely of the frame 14 is provided upon which idler pulleys 39 are mounted, the belt 33 passing over pulleys 39' and upwardly from the idler pulley 39 to a pulley 40 on the end of the shaft 41 to which the pointer 34 is connected. The shaft 41 is journaled in the instrument panel 37 and a bulkhead 42 forward of the panel. Thus upon turning the steering wheel 13 the belt through the pulley system described will also cause the pointer 34 to swing to the right or left proportionately to the amount of turning of the vehicle.

In order to control the speed with which the vehicle travels and to indicate the air speed of the vehicle, a throttle lever 43 is mounted at one end of the instrument panel 36. The throttle lever 43 is fixed to a shaft 44 which is journaled in bearings 45 and 46 on the rear side of the instrument panel. The shaft 44 also carries the commutator or wiper finger 47 of a rheostat which controls the speed of the motor 19. In order to indicate an air speed corresponding to the rate of speed of the motor, the shaft 44 is also provided with a pulley 48 which drives a belt 49 passing idler pulleys 49' and over a pulley 50 which is fixed to the shaft 51. The shaft 51 is provided with a pointer or needle 52 which swing over the dial 53. The dial 53 is calibrated in terms of miles per hour air speed.

The elevator and aileron control system of aeroplanes is simulated in the form of invention disclosed by the control stick 54. The stick 54 is provided with a transverse shaft 55 which is pivotally mounted in the arms of a yoke 56. This yoke includes a shaft 57 which is rotatably mounted in a bearing 58 mounted upon a bar or plate 59 extending between the side elements of the frame 14. The stick 54, therefore, is capable of universal movement.

The stick 54 does not actually cause an increase in altitude or the rate of climb but its effect is simulated on a rate of climb indicator 61 and an altimeter 62.

The connections between the stick 51 and the rate of climb indicator 61 consists of a pulley 63 on the end of the transverse shaft 55 which is connected by means of a belt 63a to a pulley 64 on the end of the shaft 65 to which the indicator pointer 66 is fixed. Suitable idler pulleys 67 are mounted upon the shaft 38 in order to permit a right angle change of direction of the crossed belt 63a. With this construction forward and backward movement of the stick 54 will cause a downward and upward rotation of the indicator pointer 66, thus indicating the rate of climb that would be produced in an aeroplane by such movements of the stick.

The altimeter pointer 68 is likewise controlled by the stick 54 but is under the control of the motor 19 so that by retaining the stick in a forward or rearward position, continued operation of the motor will cause a decrease or increase in the altitude indicated on the altimeter 61.

The mechanism for so operating the altimeter pointer 68 consists of a link 69 having a yoke 70 which is pivotally connected to the lower end of the stick 54. The link 69 has another yoke 71 at its opposite end which engages a lever 72 that is pivotally connected as at 73 to an extension 74 from the bulkhead 42. The lower end of the lever 72 is provided with a fork 75 in which is journaled a shaft 76 bearing a friction roller 77 and a pulley 78. The friction roller 77 engages a friction disc 79 which is fixed to a shaft 80 driven by a flexible shaft take-off from the gear reduction box 20, thus causing the friction disc to rotate slowly and at a rate proportional to the speed of the vehicle 10.

The pulley 78 is connected by means of a belt 79 to a pulley 81 on the end of the shaft 82 to which the altimeter pointer is fixed. In operation when the stick 54 is moved from its vertical or central position, the link 69 causes the friction roller 77 to be displaced from the center of the friction disc 79. As soon as the friction roller 77 is displaced it begins to rotate thus also causing a rotation of the altimeter needle 68. It will be apparent that simulated change in altitude therefore will result from a movement of the stick 54.

In addition to the instruments mentioned above, the instrument panel is provided with a compass 83 which simulates a conventional gyro compass used in aircraft and a chronometer 84.

Inasmuch as it is desirable at times to train pilots in observation work, bombing and similar other military phases of aviation and to permit the student pilot to know when he has reached a given objective, the vehicle 10 is provided with a sighting aperture, or an observation device such as a periscope 85 through which he can observe the small area of the simulated terrain over which he is maneuvering. Moreover, so that an accurate record of the student's navigation may be made, the vehicle 10 is provided with a tracing or marking device which marks upon the map the exact path followed in solving the problem. This marking device consists, as shown in Fig. 1, of a tracing wheel 86 which is fixed to the front end of the vehicle 10 and may lie beneath the differential and the periscope 85 at the center of movement of the vehicle.

With the device of the type described it is possible for a student to practice all the phases of aerial navigation with which he will be confronted in flying an aeroplane and at the same time his safety while practicing such navigation will be assured.

The device of the present invention is simple, has a minimum of working parts and yet simulates more accurately than any previously used trainer the movements of an aeroplane in flight.

It will be understood that the device may be modified in many phases, that additional control elements may be applied thereto, if it is desired, to actually simulate the banking and diving of an aeroplane, and that the shape and size of the device may be varied at will without departing from the invention. Therefore, the device disclosed above should be considered as illustrative and not as limiting the scope of the following claims.

I claim:

1. A training device comprising a land vehicle having supporting wheels, means for driving certain of said wheels to propel the vehicle along the ground, means for steering the vehicle, control means movable to simulate the movements of a control for the elevator and ailerons of an aeroplane, and separate indicators for converting the movement of the vehicle, the turning of the vehicle and the movements of said control means into indications of the air speed, the rate of turn, rate of climb and the altitude of an aeroplane in flight simulated by the movements of the vehicle and the control means.

2. A training device comprising a land vehicle having supporting wheels, a cockpit, a cover for said cockpit, means for driving certain of said wheels to propel the vehicle along the ground, speed control means for said vehicle, an indicator in said cockpit responsive to said speed control means for indicating an air speed proportional to and a multiple of the ground speed of the vehicle, steering means for said vehicle and an indicator responsive to said steering means for indicating the rate of turn of said vehicle.

3. A training device comprising a steerable land vehicle, means for propelling said vehicle at low speeds along the ground, an instrument panel in said vehicle, indicators on said panel responsive to movement and turning of said vehicle for indicating an air speed proportional to and a multiple of the ground speed of said vehicle, the rate of turn and the direction of movement of said vehicle.

4. A training device comprising a land vehicle having supporting wheels, a closed cockpit thereon, means for driving certain of said wheels to propel the vehicle slowly over an area simulating on a reduced scale a terrain, steering means for said vehicle, an air speed indicator in said cockpit responsive to movement of said vehicle for indicating and air speed proportional to and a multiple of the ground speed of the vehicle to simulate the air speed of an aircraft flying over the terrain simulated, an indicator responsive to said steering means for indicating the rate of turn of said vehicle, a compass for indicating the direction of movement of said vehicle and means in said vehicle for viewing a limited portion, only, of said area to permit the operator to determine whether an objective on said area has been reached.

5. A training device comprising a steerable land vehicle having supporting wheels, means for driving certain of said wheels to propel said vehicle over an area simulating on a reduced scale a terrain, instruments in said vehicle for indicating the direction of movement and the rate of turn of said vehicle and air speeds proportional to and higher than the ground speed of said vehicle and a sight aperture in the bottom of the vehicle to permit the operator of said vehicle to determine whether an objective has been located.

6. A training device comprising a steerable land vehicle having supporting wheels, means for driving certain of said wheels to propel said vehicle over an area simulating on a reduced scale a terrain, instruments in said vehicle for indicating the direction of movement and the rate of turn of said vehicle and air speeds proportional to and higher than the ground speed of said vehicle and means on said vehicle for marking the course traversed by said vehicle on said area.

7. A training device comprising a steerable land vehicle having supporting wheels, means for driving certain of said wheels to propel said vehicle over an area simulating on a reduced scale a terrain, instruments in said vehicle for indicating the direction of movement and the rate of turn of said vehicle and an air speed proportional to and a multiple of the ground speed of said vehicle to simulate the air speed of an aeroplane flying over the terrain at simulated observation, means in the bottom of said vehicle for viewing a portion of said area beneath said vehicle, to permit the operator of said vehicle to determine whether an objective has been located, and means on said vehicle for marking the course traversed by said vehicle on said area.

8. A training device, comprising a land vehicle having supporting wheels, means for steering said vehicle, means for propelling said vehicle at low speeds over an area simulating on a reduced scale a terrain, means simulating a control for the elevator and ailerons of an aeroplane, an instrument panel, instruments on said panel, said instruments comprising a rate of turn indicator responsive to operation of said steering means, a compass, an air speed indicator responsive to operation of said propelling means for indicating an air speed proportional to but higher than the ground speed of said vehicle, and an altimeter and a rate of climb indicator responsive to operation of said means simulating a control, whereby said vehicle may be navigated over said area in the simulation of an aeroplane flying over the said terrain.

9. A training device, comprising a land vehicle having supporting wheels, means for steering said vehicle, means for driving certain of said wheels to propel said vehicle at low speeds over an area simulating on a reduced scale a terrain, means simulating a control for the elevator and ailerons of an aeroplane, a signal reeciver, an instrument panel, instruments on said panel, said instruments comprising a rate of turn indicator responsive to operation of said steering means, a compass, an air speed indicator responsive to operation of said propelling means for indicating an air speed proportional to but higher than the ground speed of said vehicle, and an altimeter and a rate of climb indicator responsive to operation of said means simulating control, whereby said vehicle may be navigated over said area.

10. In a training device the sub-combination of means for simulting the rate of climb and altitude of an aeroplane comprising a control stick, means supporting said stick for universal movement, an instrument panel, a rate of climb indicator and an altimeter, each including a movable pointer, means connecting said stick and the pointer of said rate of climb indicator for deflecting said pointer in response to forward and rearward movement of said stick, a motor, a variable speed drive interposed between said motor and the pointer of said altimeter and means connecting said stick and said drive for varying the speed of said drive in response to forward and rearward movement of said stick.

11. A training device, comprising, a land vehicle, means for propelling said vehicle, control means simulating the controls for the elevator and ailerons of an aeroplane, an altimeter having movable indicating means, a variable speed drive connecting said movable indicating means and responsive to movement of said vehicle and means responsive to forward and rearward movement of said control means for varying the speed of said drive.

12. A training device comprising a land vehicle having supporting wheels, an electric motor for driving certain of said wheels to propel said vehicle, means including a variable resistance and a control lever therefor for controlling the speed of said vehicle, a speedometer having movable indicating means and means connecting said movable indicating means and said control lever for varying the indicated speed in response to movement of said control lever.

LUIS DE FLOREZ.